United States Patent [19]
Patzelt et al.

[11] Patent Number: 5,766,370
[45] Date of Patent: Jun. 16, 1998

[54] METHOD FOR RECOVERING A VOLATILE ORGANIC COMPONENT OF SOLVENT-IN-WATER EMULSIONS DERIVED FROM PAINT OVERSPRAY TREATMENT AND CAPTURE SYSTEMS

[75] Inventors: Robert R. Patzelt, Bloomfield Hills; Thomas Randazzo, Troy, both of Mich.

[73] Assignee: Nortru, Inc., Detroit, Mich.

[21] Appl. No.: 648,589

[22] Filed: May 16, 1996

[51] Int. Cl.$^6$ .......................................... B08B 7/04
[52] U.S. Cl. ................... 134/12; 134/10; 134/38
[58] Field of Search ................... 134/38, 10, 40, 134/12; 210/430, 702, 708, 712

[56] References Cited

U.S. PATENT DOCUMENTS

| | | | |
|---|---|---|---|
| 4,554,026 | 11/1985 | Casper et al. | 134/38 |
| 4,563,199 | 1/1986 | Lindenberger et al. | 95/189 |
| 4,750,919 | 6/1988 | Patzelt et al. | |
| 4,814,092 | 3/1989 | Patzelt | 210/708 |
| 4,854,947 | 8/1989 | Patzelt | 95/196 |
| 4,919,691 | 4/1990 | Patzelt et al. | 95/189 |
| 5,198,143 | 3/1993 | Zuerner et al. | 252/319 |
| 5,200,104 | 4/1993 | Zuerner et al. | 252/319 |
| 5,254,256 | 10/1993 | Zuerner et al. | |
| 5,334,255 | 8/1994 | James et al. | 134/38 |
| 5,397,496 | 3/1995 | Zuerner et al. | 252/319 |
| 5,466,300 | 11/1995 | Walsh et al. | 134/38 |
| 5,560,860 | 10/1996 | Walsh et al. | 134/38 X |

Primary Examiner—Jill Warden
Assistant Examiner—Alexander Markoff
Attorney, Agent, or Firm—Young & Basile, P.C.

[57] ABSTRACT

A process for recovering organic solvent material from a hydrophilic liquid derived from paint overspray treatment operations in which the solvent-in-water emulsion initially contains 1-50 weight percent of an organic liquid having a boiling point of at least 150° C., a vapor pressure less than 0.5 Torr at 20° C.; and water, and the spent hydrophilic liquid additionally contains paint solid material derived from the paint overspray treatment system in which the recovery process includes the steps of (a) removing the spent hydrophilic liquid or a portion thereof from the paint spray booth;

(b) feeding the spent hydrophilic liquid into a reaction vessel, the reaction vessel operating at a pressure less than about 100 mm/Hg and at a temperature sufficient to volatilize the organic liquid component of the hydrophilic liquid; and (c) separating a portion of said volatilized organic liquid from the spent hydrophilic liquid after introduction of the spent hydrophilic liquid into the reaction vessel. The organic liquid component is selected from the group which includes secondary alcohol esters, derivatives of secondary alcohol esters, dialkyl diesters of dibasic acids, and n-methyl pyrrolidones.

23 Claims, No Drawings

METHOD FOR RECOVERING A VOLATILE ORGANIC COMPONENT OF SOLVENT-IN-WATER EMULSIONS DERIVED FROM PAINT OVERSPRAY TREATMENT AND CAPTURE SYSTEMS

BACKGROUND OF THE INVENTION

1. Field of the Invention

This invention pertains to the recovery of organic materials such as carbonyl compounds, dialkyl diesters of dibasic acids, or n-methyl pyrrolidone from spent solvent-in-water emulsions which are derived from paint overspray treatment and capture systems. More specifically, this invention pertains to a process for recovering organic materials such as carbonyl compounds, dialkyl diesters of dibasic acids, and n-methyl pyrrolidone from solvent-in-water emulsions derived from paint overspray treatment and capture systems by processing the spent solvent-in-water emulsion in a reaction vessel at negative pressure and elevated temperature sufficient to volatilize the organic solvent material.

2. Discussion of the Relevant Art

Operation of paint spray booths using solvent-in-water emulsions which permit the collection of hydrocarbon emissions from paint solvents, solubilizing various types of paints, and dispersion and collection of both solubilized and non-solubilized solids has been set forth in U.S. Pat. No. 4,919,691 to Patzelt et. al. as well as in U.S. Pat. Nos. 5,198,143; 5,397,496, 5,200,104 and 5,254,256 all to Zuerner et al. Operation of paint spray booths using solvent/water materials such as n-methyl pyrrolidone and water for these purposes has also been set forth in U.S. Pat. Nos. 4,444,573; 4,523,932 and 4,554,026 to Cosper et al. The relevant portions of all of the previously mentioned patents is incorporated by reference herein.

Solvent-in-water emulsions employed in the paint spray booths serve as a replacement for a conventional water system and act as a collection medium for hydrocarbon vapors and for paint overspray. The paint overspray contacts the solvent-in-water circulating in the paint spray booth. The material is solubilized and the paint solids are dispersed within the solvent-in-water emulsion. The paint solids are recirculated within the solvent-in-water emulsion until the solvent-in-water emulsion is removed from the paint spray booth system. After removal, the solvent-in-water emulsion containing paint solids was broken or allowed to break into its separate phases as part of the recovery process. These separate phases are generally an organic phase containing solubilized paint solids and an aqueous phase.

The separated phases are then treated and reused or disposed of as necessary. For instance, Patzelt U.S. Pat. No. 4,919,691 suggests the use of recovered aqueous portions of spent emulsion in recycled solvent-in-water emulsion materials. U.S. Pat. No. 4,814,092 to Patzelt discloses a method for processing spent emulsions derived from paint overspray treatment and capture systems using a centrifuge to separate and recover paint solids from the spent treatment emulsion. That reference suggests that the paint solids derived from the spent emulsion can be used in bunker fuel formulations and the like. However, no effective method of direct, efficient recovery of the organic solvent portion of spent solvent-in-water emulsions has been discovered to date.

In order to obtain maximum efficiency and economy in the paint overspray treatment and capture process, it is desirable to recover the organic solvent component from spent solvent-in-water emulsions derived from the overspray treatment system. Such recovered organic solvent component could be suitable for reuse in the paint overspray treatment and capture system. However a significant portion of the solvent component has remained unrecoverable due to the presence of and interaction with paint solids in the spent solvent-in-water emulsion. The paint solids in the spent emulsion make it difficult to effectively recover any significant amount of relatively pure organic solvent.

Heretofore, processing of spent solvent-in-water emulsions containing paint solids was generally directed toward achieving volumetric reductions in the amount of material which had to be handled and/or disposed of. Processing spent solvent-in-water emulsions derived from paint overspray treatment and capture systems was generally directed to separation of the organic and aqueous phases of the emulsion. The separated phases could either be disposed of or could be handled more efficiently in subsequent processing steps in their separate phases. Generally, the aqueous phase derived from the spent paint overspray treatment emulsion could be reused in the paint overspray treatment and capture system. The organic phase was not as readily useable due to the presence of paint solids solubilized therein. Separation of the organic solvent component from the paint solids was so difficult that large portions of the solvent remained in contact with the paint solids and was essentially non-recoverable.

Various techniques have been suggested for separating solvent from spent solvent-in-water emulsions derived from paint overspray treatment and capture systems. In these techniques, the presence of paint solids derived from the paint overspray treatment system creates problems of solvent retention and thermal decomposition of the paint solids during recovery processes. Temperatures necessary to accomplish volatilization of the organic solvent have resulted in uneven solidification of the paint solids thereby trapping a significant amount of the organic solvent in the solidifying paint solids mass. Additionally, the processing temperatures necessary to volatilize the organic solvent have also resulted in thermal decomposition of the paint solids. The thermally decomposed solids are difficult not only to remove from any reaction vessel but also to handle once removed.

Thus, it is desirable to provide a process whereby volatile organic solvent components of solvent-in-water emulsions derived from paint overspray treatment and capture systems can be efficiently and successfully recovered from spent solvent-in-water emulsions containing paint solid materials. It is also desirable to provide a process whereby the volatile organic solvent component can be recovered in a manner which minimizes thermal decomposition of paint solid compounds.

SUMMARY OF THE INVENTION

The present invention is a process for recovering a volatile organic solvent component of solvent-in-water emulsions employed in a process for removal of paint particles from paint overspray treatment and capture systems. The paint overspray treatment and capture systems in which the solvent-in-water emulsion is employed include booths of the type comprising a chamber, means for passing a wash stream capturing oversprayed paint particles across a liquid curtain and down through the chamber, a sump located at the bottom of the chamber and containing circulating solvent-in-water emulsion receiving said oversprayed paint particles from the wash stream. The solvent-in-water emulsion is comprised of:

(a) 1–50 weight percent of an organic solvent having a boiling point of at least 150° C., a vapor pressure less than about 0.6 Torr at 20° C.; and (b) water.

The solvent-in-water emulsion is circulated through the paint spray booth until the emulsion collects, detackifies, and suspends paint solids, thereby forming a spent solvent-in-water emulsion. In such systems, the present invention is an improvement comprising:

(a) removing at least a portion of the spent solvent-in-water emulsion from the paint overspray treatment and capture system;

(b) feeding the removed spent solvent-in-water emulsion into a reaction vessel, the reaction vessel operating at a pressure less than 100 mm/Hg absolute and at a temperature sufficient to generate a volatilized organic solvent component;

(c) volatilizing organic solvent material from the spent solvent-in-water emulsion contained in the reaction vessel;

(d) removing the volatilized organic solvent material from the reaction vessel; and (e) removing residual material remaining in the reaction vessel after generation of the discrete volatilized organic solvent material, the residual material consisting essentially of organic materials derived from paint solids and inorganic materials present in the paint.

In the process of the present invention solvent recovery can be performed on spent solvent-in-water emulsions from which the water portion has been completely or partially removed. It is within the purview of this invention to co-generate water with the solvent to be recovered. It is also within the purview of this invention to separately generate water apart from the solvent as would be accomplished by processing spent solvent-in-water emulsion from which some or all of the water has been removed.

DESCRIPTION OF THE PREFERRED EMBODIMENT

The present invention is predicated on the discovery that spent solvent-in-water emulsions derived from paint overspray treatment and capture systems can be effectively processed to remove at least a portion of the organic solvent component for recycle and reuse where the spent solvent-in-water emulsion is processed at elevated temperature under vacuum. The spent solvent-in-water emulsions contain paint solid material dispersed, dissolved or solubilized therein. The recovered organic solvent component is of significant purity and of greater yield than that which can be recovered using conventional processes.

The solvent-in-water emulsion employed in paint overspray treatment and capture systems which can be processed by the solvent recovery method of the present invention contains at least one organic solvent component capable of dissolving at least small amounts of paint solids. The term "dissolving" as employed subsequently herein is defined as a process which encompasses both dispersal and passing into solution or solubilization of solid component. As employed herein the term "emulsion" is defined as the mixing of a liquid phase into another liquid phase. The term emulsion as used in this document includes both permanent emulsions, i.e. those characterized by particle diameters of 1 to 1.5 μm or less; and non-permanent emulsions, i.e. those characterized by particle diameters greater than 1 μm.

The spent solvent-in-water emulsion is derived from paint overspray treatment systems and is comprised of:

(a) 1–50 weight percent of an organic solvent having a boiling point of at least 150° C. and a vapor pressure less than 0.6 Torr at 20° C.; and (b) water.

The solvent-in-water emulsion generally has a pH ranging between about 7.5–12.0 and is circulated through the paint spray booth for an interval sufficient to permit the emulsion to collect, solubilize and suspend oversprayed paint solids to form a spent solvent-in-water emulsion. The concentration of paint solids suspended in the solvent-in-water emulsion during operation of the paint overspray treatment and capture system can vary depending upon the duration and intensity of usage. The maximum paint solid concentration level can be any amount provided that the spent solvent-in-water emulsion remains pumpable by conventional means.

In the present invention, the organic solvent component is recovered from spent solvent-in-water emulsion derived from a paint overspray treatment and capture system by a method comprising the following steps:

(a) removing the spent solvent-in-water emulsion or a portion thereof from the paint overspray treatment and capture system;

(b) feeding the removed spent solvent-in-water emulsion into a reaction vessel, the reaction vessel operating under a vacuum and at a temperature sufficient to generate a volatilized organic solvent component;

(c) volatilizing organic solvent material from the spent solvent-in-water emulsion contained in the reaction vessel;

(d) removing the generated organic solvent material from the reaction vessel; and (e) removing residual material remaining in the reaction vessel after volatilizing the organic solvent material, the residual material consisting essentially of organic and inorganic materials derived from paint solids.

It is to be understood that in the process of the present invention, the generation of volatilized organic solvent can proceed with or without the co-generation of water. In situations in which water has been previously removed from the spent solvent-in-water emulsion, volatilization of the organic solvent will occur without co-generation of water. In situations in which water remains in the spent solvent-in-water emulsion, that water portion may either be removed in a separate processing step prior to the solvent volatilization step or may be co-generated and separated in a post processing step.

The organic solvent component to be recovered by the process of the present invention preferably, has a flash point greater than 90° C. (Tag closed cup method). The organic solvent is, preferably selected from the group consisting of carbonyl compounds, dialkyl diesters of dibasic acid, and n-methyl pyrrolidone. The solvent-in-water emulsion from which the organic solvent is to be recovered by the process of the present invention may include other optional components such as surfactants, emulsifiers and the like. These optional components of the solvent-in-water emulsion have may be processed along with the primary components or may be processed in several separate steps.

The organic solvent to be recovered from the spent solvent-in-water emulsion by the process of the present invention is, preferably, selected from the group consisting of carbonyl compounds selected from the group consisting of secondary alcohol esters, secondary alcohol ester derivatives, and mixtures thereof, dialkyl diesters of dibasic acids, and n-methyl pyrrolidone.

When the solvent component of the solvent-in-water emulsion is a carbonyl compound, the material is, preferably, selected from the group consisting of compounds having the general formula:

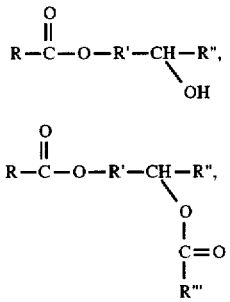

and mixtures thereof; wherein R' and R" are chosen from substituted and unsubstituted secondary alkyl groups having between 1 and 8 carbon atoms in the main chain; and R and R'" are chosen from linear or branched alkyl groups having between 1 and 10 carbon atoms wherein R and R'" may be either identical or different alkyl functionalities. In the preferred embodiment R' and R" are chosen from the group consisting of unsubstituted ethyl, propyl, butyl, pentyl, and hexyl functionalities as well as the mono-, di- and tri-alkyl substituted derivatives thereof such as methyl propyl, methyl butyl, ethyl butyl, methyl propyl, dimethyl butyl, dimethyl pentyl, or trimethyl pentyl functionalities. R and R'" are chosen from the group consisting of propyl, isopropyl, butyl, isobutyl, or t-butyl functionalities.

Suitable carbonyl compounds preferably have physical characteristics within the parameters set forth in Table I. Carbonyl compounds selected from the group consisting of 2,2,4-trimethyl-1,3-pentanediol monoisobutyrate, 2,2,4-trimethyl-1,3-pentanediol diisobutyrate, and mixtures thereof are preferred.

TABLE I

| PHYSICAL CHARACTERISTICS OF HYDROCARBON | |
|---|---|
| Boiling Point | 200° to 300° C. |
| Specific gravity (20° C.) | 0.94 to 0.955 |
| Water solubility | Insoluble |
| Viscosity (20° C.) | 8 to 14 cP |
| Vapor Pressure | <0.01 mm Hg (at 20° C. and 1 atom) |

Dialkyl diesters of dibasic acids which can be employed in solvent-in-water emulsions suitable for solvent recovery by the process of the present invention are preferably chosen from the group consisting of dialkyl dibasic esters of dibasic acids or mixtures thereof having the structure:

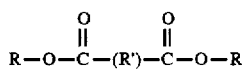

wherein R is chosen independently, at each occurrence from linear or branched alkyl groups containing from 1–6 carbon atoms, preferably from 1–4 carbon atoms, R is most preferably chosen independently at each occurrence from methyl, ethyl, propyl, and isopropyl alkyl groups. R' is a linear or branched alkaline group containing from 2–12 carbon atoms, preferably containing 2–8 carbon atoms and most preferably between 2–6 carbon atoms. R' is primarily linear methylene repeating units containing 2–8 carbon atoms.

The dialkyl diesters of dibasic acid are particularly exemplified by polar organic solvents chosen from the group consisting of dimethyl adipate, dimethyl glutarate, dimethyl succinate, and mixtures thereof. Such materials are commercially available from the DuPont de Nemours Company and are generally referred to as DBE. Several examples of DBE's are available commercially and can include dimethyl adipate, dimethyl glutarate, and dimethyl succinate in various purities or admixed in various concentrations ranging from about 15–90 weight percent dimethyl adipate, 10–99 weight percent dimethyl glutarates, and 0.5–99 weight percent dimethyl succinates, and various admixtures thereof. Preferably, a mixture of these dibasic esters is employed as the solvent component of the solvent-in-water emulsion containing from about 15 to about 20 weight percent dimethyl adipate, from about 60 to about 70 percent dimethyl glutarates, and from about 15 to about 20 weight percent dimethyl succinates.

In the process of the present invention, the spent solvent-in-water emulsion can be introduced into the reaction vessel essentially in the form in which it is removed from the paint overspray treatment and capture system. The spent solvent-in-water emulsion can then be processed according to the present method. Alternately, the solvent recovery process of the present invention can include an optional step in which at least a portion of the aqueous component of the solvent-in-water emulsion is removed prior to introduction of the spent solvent-in-water emulsion into the reaction vessel. The dewatering step can be accomplished by suitable means such as separating the emulsion into its aqueous and organic phases and decanting or otherwise removing at least a portion of the aqueous phase from contact with the organic phase. The emulsion can be allowed to break spontaneously, if possible, or more likely, can be broken by suitable mechanical or chemical means. Examples of suitable breaking of solvent-in-water emulsions used with paint overspray treatment and capture systems by acidification of the emulsion are outlined in U.S. Pat. Nos. 4,814,092 and 4,919,691 both to Patzelt et al and U.S. Pat. Nos. 5,198,143; 5,200,104; 5,254,256 and 5,397,496 all to Zuerner et al. Other methods such as distillation, ultrafiltration and the like are also contemplated as the optional dewatering step.

In instances in which the spent solvent-in-water emulsion is subjected to a dewatering step prior to introduction into the reaction vessel, it is to be understood that the concentration of recoverable solvent in the spent solvent-in-water emulsion material introduced therein can be significantly higher than previously indicated. Where the spent solvent-in-water emulsion is dewatered, the concentration of solvent in the spent solvent-in-water emulsion material introduced into the reaction vessel can be as high as 85–90 weight percent; with solvent concentrations between about 40 and about 75 weight percent being typical.

The process of the present invention can also include the optional step of generating volatilized aqueous fluid from the solvent-in-water emulsion contained within the reaction vessel. The aqueous fluid can be co-generated with the volatilized solvent material or can be generated in a separate step such as an incremental heating process in which a major portion of the generated aqueous material is volatilized prior to volatilization of the solvent component. In situations where the solvent and water are co-generated, the recovery process of the present invention contemplates the further step in which the organic and aqueous materials are either allowed to separate and decanted or are actively separated by suitable mechanical or chemical process as would be known to those skilled in the art.

Spent solvent-in-water emulsions from which the organic solvent is recovered in the process of the present invention are those derived from paint overspray treatment systems.

As such, these spent emulsions contain solid components of paint including, but not limited to, resinous binders, fillers, and adhesives, as well as pigments, preservatives, texture enhancing agents and the like. Collectively, these materials are referred to as "paint solids". The paint solids component of the spent solvent-in-water emulsion is generally contained in a dissolved state in the emulsion. The amount of paint solids present in the spent solvent-in-water emulsion introduced into the reaction vessel in the process of the present invention can vary greatly but generally does not exceed paint solid concentration levels which would impede the effective function of the paint overspray treatment and capture system.

In the process for recovering organic solvent from the spent solvent-in-water emulsion derived from paint overspray treatment and capture systems, the spent emulsion removal step may be accomplished in any suitable manner such as by pumping, gravity feed or the like. It is within the purview of this invention to feed spent solvent-in-water emulsion directly to the suitable reaction vessel from the overspray treatment system or to collect the spent solvent-in-water emulsion in suitable holding tanks or other devices for transport and/or later processing. The optional dewatering step can be performed during transport from the overspray treatment system to the reaction vessel or while the spent solvent-in-water emulsion is collected in suitable holding tank devices. Alternately, the optional dewatering step can be performed at the outset of the solvent recovery process of the present invention once the spent solvent-in-water emulsion has been introduced into the reaction vessel.

It is anticipated that spent solvent-in-water emulsion can be removed from the overspray treatment and capture device on a continuous incremental basis during regular operation. It is also within the scope of this invention to completely remove essentially all spent solvent-in-water emulsion from the overspray treatment system as would occur during system shutdown or the like.

The reaction vessel to which the spent solvent-in-water emulsion is introduced is a device having a reaction chamber with a non-oxidative atmosphere operating under vacuum and at elevated temperature. While dwelling in the reaction vessel, the spent solvent-in-water emulsion can be agitated by any suitable agitation device to control diffusion of the organic solvent component from contact with the paint solid material.

In the process of the present invention, the spent solvent-in-water emulsion is heated to a temperature sufficient to volatilize the solvent component from the spent solvent-in-water emulsion. The process occurs under vacuum. In the preferred embodiment, the solvent-in-water emulsion is exposed to a temperature sufficient to effect rapid volatilization of the carbonyl compound component relative to the remaining spent emulsion material. The reaction temperature employed in the process of the present invention is sufficient to drive the solvent compound from contact with paint solid material. It has been found that initial amounts of solvent material are driven off more readily than latter amounts. These latter amounts require greater driving force to separate from the paint solid matrix. Generally, the reaction temperature is equal to or greater than about 50° F. above the boiling point of the carbonyl compound at the given vacuum level employed, with the maximum reaction temperature limited at its upper range by the thermal decomposition temperature of paint solids present in the spent emulsion. Preferably, the reaction temperature is between about 50° F. and about 100° F. above the boiling point of the organic solvent to be recovered at the pressure employed.

It has been discovered that when spent solvent-in-water emulsions containing carbonyl compounds such as those defined herein are exposed to the defined process temperatures under vacuum, the spent solvent-in-water emulsion exhibits volatilization of the solvent compound over a very narrow temperature gradient. This aids in ensuring recovery of solvent material of significant purity as a result of the process of the present invention.

As indicated, the recovery process of the present invention is carried out under vacuum to augment the generation of the volatilized organic solvent. Preferably, the recovery process of the present invention occurs at a pressure less than 100 mm/Hg absolute; with a pressure between about 10 and 40 mm/Hg absolute being preferred.

The interval for processing is dependant on the diffusion rate of the solvent material relative to paint solids present in the spent solvent-in-water emulsion as introduced into the reaction vessel as well as the degree of "dryness" desired for final residual material. As used herein, the term "dryness" is defined as the amount of solvent retained in the residual material at the completion of processing.

The reaction vessel employed in the process of the present invention includes means for providing an elevated reaction temperature within the reaction chamber of the vessel. The temperature providing means include any suitable heating element or elements capable of providing an interior process temperature sufficient to generate volatile organic solvent from the solvent-in-water emulsion. The temperature providing means also includes suitable heat transfer surface area sufficient to promote rapid extensive heating of the solvent-in-water emulsion. The volume and configuration of the reaction vessel can be configured to maximize heating surface area relative to the volume of the solvent-in-water emulsion to be processed and the desired processing time.

The reaction vessel employed in the process of the present invention also includes means for providing a negative pressure environment in the reaction chamber. The vacuum in the reaction vessel can be drawn by any suitable vacuum pump means. Preferably the vacuum drawing means is one capable of maintaining an essentially constant pressure less than 100 mm/Hg absolute for an interval sufficient to generate the volatile organic solvent material; with a pressure level between about 10 mm/Hg and about 40 mm/Hg being preferred.

The solvent recovery process of the present invention, includes means for providing a non-oxidative atmosphere in the reaction chamber. The non-oxidative gaseous atmosphere employed is one which will not support combustion under the defined process conditions. Gaseous materials of choice specifically include those which will prevent or deter burning of the paint solids and fires in the reaction vessel during the recovery process of the present invention. Suitable gaseous materials include but are not limited to, nitrogen, noble gases, and mixtures thereof. It is also within the scope of the invention to employ gases having trace amounts of oxidative material such as oxygen, provided the amount of oxidative material is below the flammability threshold.

The reaction vessel preferably includes means for agitating the spent solvent-in-water emulsion introduced therein. Preferably, the agitation means include a mixing shaft rotating at a shaft speed sufficient to maintain the spent solvent-in-water emulsion in an agitated state during residence in the reaction vessel. For maximum efficiency, the mixing shaft includes a plurality of blades having surface configurations which enhance the mixing and grinding action imparted to the paint solids during the processing. The agitation means employed is sufficient to mix and grind solid and solidifying paint solid materials to expose interior surfaces of the pasty solidifying paint solid material to enhance the solvent diffusion process in a controlled manner and enhance generation of the volatile organic solvent component together with the formation of suitable final phase solid type material.

The reaction vessel employed in the process of the present invention also includes suitable means for collecting the volatile organic solvent generated as a result of the process. The solvent collection means can be any suitable overheads condensation mechanisms or the like.

When spent solvent-in-water emulsion is heated under vacuum at the defined processing temperatures, the organic solvent component of the solvent-in-water emulsion exhibits volatilization over a very narrow temperature range thereby ensuring recovery of solvent material of significant purity. The vacuum process of the present invention permits volatilization and recovery of the organic solvent component of the spent solvent-in-water emulsion in a temperature range which maximizes the efficiency of the volatilization process while minimizing the decomposition of the paint solid component.

Solid material remaining as residue of the solvent recovery process of the present invention can be separately collected and has, as a major component, high molecular weight polymers and resins derived from paint solids. Depending on the extent of the solvent recovery process, paint solid residue typically can be characterized as dry granular material. The solid resin residue produced in the process of the present invention can be readily and easily handled for disposal, subsequent post processing treatment, or raw material use.

Without being bound to any theory, it is believed that processing the spent solvent-in-water emulsion derived from paint overspray treatment and capture systems under vacuum at the defined temperatures with agitation promotes the diffusion of the solvent component from the spent emulsion material and generation as a volatilized material. Heating the extensive surface area of the mixing surfaces provides rapid, systematic volatilization of the solvent component and initiates the solidification of the solid or solidifiable resinous paint components in the process stream as the solvent component is volatilized. Continued agitation maintains the turbulent action of the solvent-in-water emulsion during processing and prevents the accumulation of solids on the heating elements and the formation of accumulated material having an outer crusty surface which prevents diffusion of the solvent therefrom. This also helps to prevent thermal decomposition of the solid or solidifiable paint components present in the process stream.

The process of the present invention may also include an optional preheating step in which the spent solvent-in-water emulsion derived from paint overspray treatment and capture systems is exposed to a temperature greater than the boiling point of water at the given pressure in the reaction vessel for an interval sufficient to drive off at least a portion of the water and any light ends solvents which may be present in the spent solvent-in-water emulsion. The pre-heat temperature is preferably in a range which will permit volatilization of water and light ends solvents without compromising the integrity of the solvent component and paint solids which remain. The pre-heat interval can be adjusted to optimize the removal of volatilizable materials such as light ends solvents, water and the like.

As processed, the resulting solid by-product is a material which consists essentially of resinous material in essentially granular form. The term "essentially granular material" as used herein is defined as a solid particulate pourable material. It is to be understood that the essentially granular material produced as a by-product of the present invention will have chemical characteristics which are dependant upon the initial composition of the paint solid material in the spent solvent-in-water emulsion. It is to be understood that the paint solid components can vary depending upon the initial nature of the paint treated by the overspray treatment process from which the spent solvent-in-water emulsion is derived. The separation of volatile organic liquid can proceed until the granular material is formed. The resulting material can be characterized as a dry granulate solid consisting of paint solids.

The volatilized solvent material recovered by the process of the present invention can be condensed and reused in suitable applications. The solvent component recovered remain essentially unchanged as a result of the process of the present invention. Thus, these recovered materials can be employed successfully in processes such as those outlined in the various Zuerner patents previously discussed.

In order to more fully understand the process of the present invention, the following illustrative examples are provided. These examples are to be considered illustrative of the present invention and in no way limit the scope or breadth of the invention herein claimed.

EXAMPLE I

An emulsion sample was collected from the material produced in the paint overspray process as outlined in U.S. Pat. No. 5,198,143 employing 2,2,4-trimethyl-1,3-pentanediol diisobutyrate. The sample material was acidified to break the emulsion. Twenty grams of the organic phase was heated on a hot plate to evaporate all volatile components. The vapors from the concentrate were passed through a condenser where the volatile components were condensed and collected. The organic layer from the condenser was analyzed and determined to be 78% 2,2,4-trimethyl-1,3-pentanediol diisobutyrate, the main constituent of the overspray treatment emulsions.

EXAMPLE II

Two hundred grams of a composite sample of concentrate collected by the process outlined in Example I was placed in a 500 ml round bottom flask along with 83 ml mineral oil. Mineral oil was used to prevent hardening of the resins present in the sample during the test. The mixture was heated to 220° F. in a 28 inch vacuum. Under these conditions the diisobutyrate component and some of the oil were found to be volatile. The vapors from the experiment were condensed and collected. The organic layer weighed 93 gm and was analyzed and found to contain diisobutyrate. Calculated diisobutyrate recovery was 30.5 gm. The concentrate was analyzed as 17.1 gm diisobutyrate, thus recovery was 90%

What is claimed is:

1. In a process for removal of oversprayed paint particles from a paint spray booth of the type comprising a chamber, means for passing a wash stream capturing said oversprayed paint particles across a liquid curtain and down through said chamber, a sump located at the bottom of said chamber and containing a circulating solvent-in-water emulsion receiving said oversprayed paint particles from said wash stream, said solvent-in-water emulsion comprised of:

1–50 weight percent of a volatile organic liquid having a boiling point of at least 150° C. a vapor pressure less than about 0.6 Torr at 20° C.; and water, and wherein the solvent-in-water emulsion is circulated through the paint spry booth until the solvent-in-water emulsion collects, solubilizes and suspends at least a portion of said oversprayed paint particles, thereby forming a spent solvent-in-water emulsion, the improvement comprising:

(a) removing at least a portion of the spent solvent-in-water emulsion from the paint spray booth;

(b) feeding the removed portion of the spent solvent-in-water emulsion into a reaction vessel, the reaction vessel operating under a pressure less than 100 mm/Hg absolute and at a temperature sufficient to volatilize the volatile organic liquid;

(c) volatilizing the volatile organic liquid contained in the portion of the spent solvent-in-water emulsion removed from the paint spray booth and fed in the reaction vessel, wherein the volatilizing step is continued until essentially all of said volatile organic liquid has been separated with the paint particles originally suspended in the removed spent solvent-in-water emulsion and a dry granulate solid consisting essentially of paint solids is produced;

(d) collecting at least a portion of the volatile organic liquid produced in the volatilizing step separate from the portion of the spent solvent-in-water emulsion originally removed from the paint spray booth and said oversprayed paint particles suspended therein from the spent solvent-in-water emulsion introduced into the reaction vessel; and (e) admixing said volatile organic liquid collected during the collection step with water to form a reclaimed solvent-in-water emulsion for use in a paint spray booth, wherein the reaction vessel is maintained at an operating temperature between about 50° F. greater than the boiling point of the organic liquid and thermal decomposition temperature of paint solids contained in the solvent-in-water emulsion at the defined pressure present therein.

2. The process of claim 1 wherein the reaction vessel is maintained at an operating temperature between about 50° F. and about 100° F. greater than the boiling point of the organic liquid contained in the reaction vessel at the defined pressure present therein.

3. The process of claim 1 wherein water contained in the portion of the spent solvent-in-water emulsion removed from the paint spray booth is volatilized together with the volatile organic liquid during the volatilization step.

4. The process of claim 3 further comprising the step of separating volatilized water from said volatilized organic liquid produced in the volatilizing step and collecting in the collecting step.

5. The process of claim 1 further comprising the step of removing at least a portion of the water present in the portion of the spent solvent-in-water emulsion removed from the paint spray booth prior to said separating step.

6. The process of claim 1 further comprising the step of agitating the removed portion of the spent solvent-in-water emulsion during residence in the reaction vessel.

7. The process of claim 1 wherein the pressure employed is maintained between about 10 and about 40 mm/Hg absolute.

8. The process of claim 1 wherein the volatile organic liquid present in the spent solvent-in-water emulsion is selected from the group consisting of:

i a carbonyl compound selected from the group consisting of:

carbonyl compounds having the general formula:

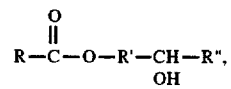

derivatives of carbonyl compounds having the general formula:

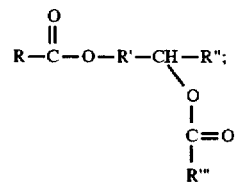

mixtures thereof, wherein R' and R" are chosen from the group consisting of substituted alkyl groups, unsubstituted alkyl groups and mixtures thereof, said substituted alkyl groups having from 1 to 8 carbon atoms, wherein R and R'" are chosen from the group consisting of linear alkyl groups having from 1 to 10 carbon atoms, branched alkyl groups having from 1 to 10 carbon atoms, R and R'" being either identical or different alkyl functionalities, said carbonyl compounds being capable of dissolving at least a minor portion of the solid compound while remaining essentially insoluble in and non-reactive with an aqueous media;

ii dialkyl diesters of dibasic acids, or mixtures thereof having the structure:

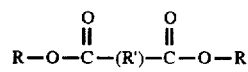

wherein R is, independently, at each location, chosen from linear or branched alkyl groups containing 1 to 6 carbon atoms, R' is a linear or branched alkyl group containing from 2–12 carbon atoms; and iii n-methyl pyrrolidone.

9. The process of claim 1 wherein the volatile organic liquid is a carbonyl compound selected from the group consisting of secondary propanol esters, secondary butanol esters, secondary pentanol esters, condensation products of a reaction between secondary propanol esters and carboxylic acid condensation products of a reaction between secondary butanol esters and carboxylic acid, condensation products of a reaction between secondary pentanol esters and carboxylic acid, and mixtures thereof.

10. The process of claim 9 wherein the carbonyl compound is selected from the group consisting of 2,2,4-trimethyl-1,3-pentanediol monoisobutyrate, 2,2-4-trimethyl-1,3-pentanediol diisobutyrate, and mixtures thereof.

11. The process of claim 1 wherein the volatile organic liquid is a dialkyl dibasic ester selected from the group consisting of dimethyl adipate, dimethyl glutarate, dimethyl succinate, and mixture thereof.

12. The process of claim 1 wherein the volatile organic liquid is a n-methyl pyrrolidone.

13. The process of claim 1 further comprising the step of concentrating the volatile organic liquid relative to the water in the spent solvent-in-water emulsion prior to the feeding step.

14. The process of claim 1 wherein the separation step proceeds in an inert atmosphere which does not support combustion.

15. In a process for removal of oversprayed paint particles from a paint spray booth of the type comprising a chamber, means for passing a wash stream capturing oversprayed paint particles across a liquid curtain and down through said chamber, a sump located at the bottom of said chamber and containing a circulating solvent-in-water emulsion receiving said oversprayed paint particles from said wash stream, said solvent-in-water emulsion comprised of:

(A) 1–50 weight percent of a volatile organic liquid selected from the group consisting of:
(1) a carbonyl compound selected from the group consisting of:
a) carbonyl compounds having the general formula:

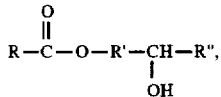

b) derivatives of carbonyl compounds having the general formula:

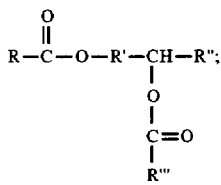

c) mixtures thereof,
wherein R' and R" are chosen from the group consisting of substituted alkyl groups, unsubstituted alkyl groups and mixtures thereof, said substituted alkyl groups having from 1 to 8 carbon atoms, wherein R and R'" are chosen from the group consisting of linear alkyl groups having from 1 to 10 carbon atoms, branched alkyl groups having from 1 to 10 carbon atoms, R and R'" being either identical or different alkyl functionalities, said carbonyl compounds being capable of dissolving at least a minor portion of the solid compound while remaining essentially insoluble in and non-reactive with an aqueous media; and
(2) dialkyl diesters of dibasic acids, or mixtures thereof having the structure:

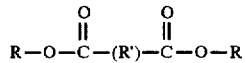

wherein R is, independently, at each location, chosen from linear or branched alkyl groups containing 1 to 6 carbon atoms, R' is a linear or branched alkyl group containing from 2–12 carbon atoms,
wherein the volatile organic liquid has a boiling point of at least 150° C., a vapor pressure less than 0.6 Torr at 20° C.; and
(B) water, and
wherein the solvent-in-water emulsion is circulated through the paint spray booth until the solvent-in-water emulsion collects, detackifies, and suspends oversprayed paint particles, thereby forming a spent solvent-in-water emulsion, the improvement comprising:

(a) removing at least a portion of the spent solvent-in-water emulsion from the paint spray booth;

(b) feeding the portion of the spent solvent-in-water emulsion removed from the paint spray booth into a reaction vessel, the reaction vessel operating under a pressure less than 100 mm/Hg absolute, a temperature between about 50° F. and about 100° F. greater than the boiling point of the organic liquid at said pressure, the reaction vessel having an inert gaseous atmosphere unable to support combustion;

(c) while the removed portion of the spent solvent-in-water emulsion resides in the reaction vessel, volatilizing the volatile organic liquid present in the solvent-in-water emulsion removed from the reaction vessel;

(d) separating the volatile organic liquid from the removed spent solvent-in-water emulsion and the paint particles suspended therein after volatilization of the volatilic organic liquid present in the removed spent solvent-in-water emulsion in the reaction vessel;

wherein said volatilizing step is continued until essentially all of said volatile organic liquid has been separated from said paint particles and a dry granulate solid consisting essentially of paint solids is produced.

16. The process of claim 15 wherein the volatile organic liquid is a carbonyl compound selected from the group consisting of secondary propanol esters, secondary butanol esters, secondary pentanol esters, condensation products of a reaction between secondary propanol esters and carboxylic acid, condensation products of a reaction between secondary butanol esters and carboxylic acid, condensation products of a reaction between secondary pentanol esters and carboxylic acid, and mixtures thereof.

17. The process of claim 16 wherein the carbonyl compound is selected from the group consisting of 2,2,4-trimethyl-1,3-pentanediol monoisobutyrate, 2,2-4-trimethyl-1,3-pentanediol diisobutyrate, and mixtures thereof.

18. The process of claim 15 wherein volatile organic compound is a dialkyl dibasic ester selected from the group consisting of dimethyl adipate, dimethyl glutarate, dimethyl succinate, and mixture thereof.

19. The process of claim 15 wherein the pressure is between about 10 mm/Hg absolute and about 40 mm/Hg absolute.

20. The process of claim 15 further comprising the step of concentrating the volatile organic liquid relative to water present in the portion of the spent solvent-in-water emulsion removed from the paint spray booth, the concentration of the volatile organic liquid occurring prior to the feeding step.

21. The process of claim 15 wherein water contained in the portion of the solvent-in-water emulsion removed from the paint spray booth is volatilized along with the volatile organic liquid component.

22. The process of claim 21 further comprising the step of separating volatilized water from said volatilized organic liquid after said volatilized organic liquid has been separated from said portion of the solvent-in-water emulsion removed from the paint spray booth and introduced into said reaction vessel.

23. The process of claim 15 further comprising the step of removing at least a portion of the water initially present in the portion of the solvent-in-water emulsion removed from the paint spray booth prior to removal of the organic liquid.

* * * * *